USOO5535963A

United States Patent [19]
Lehl et al.

[11] Patent Number: 5,535,963
[45] Date of Patent: Jul. 16, 1996

[54] TRANSPORTATION SYSTEM EMPLOYING AIRCRAFT GUIDED BY RAIL

[75] Inventors: Elvest L. Lehl; Glen W. Zumwalt, both of Wichita, Kans.

[73] Assignee: Airtrain Incorporated, Wichita, Kans.

[21] Appl. No.: 273,349

[22] Filed: Jul. 11, 1994

[51] Int. Cl.$^6$ ............................... B64D 3/00; B62D 1/02
[52] U.S. Cl. ........................ 244/3; 244/100 C; 104/23.1; 104/89
[58] Field of Search ............................... 244/2, 3, 100 C; 104/23.1, 23.2, 89, 93, 118, 119, 121; 105/150, 152

[56] References Cited

U.S. PATENT DOCUMENTS

| | | | |
|---|---|---|---|
| 1,798,852 | 3/1931 | Roghmanns | 104/23.1 |
| 3,444,823 | 5/1969 | Akmentin | 104/23.1 |
| 3,534,689 | 10/1970 | Barthalon | 104/23.1 |
| 3,580,181 | 5/1971 | Bertin | 104/23.2 |
| 3,675,582 | 7/1971 | Girard et al. | 104/23.1 |
| 3,799,061 | 3/1974 | Bertin | 104/23.2 |
| 4,102,272 | 7/1978 | Lehl et al. | |
| 4,175,637 | 11/1979 | Bertelsen | 104/23.1 |
| 4,265,181 | 5/1981 | Schreyer et al. | 105/151 |
| 4,703,697 | 11/1987 | Bell | 104/23.1 |
| 5,231,932 | 8/1993 | Enderlein et al. | 104/89 |

*Primary Examiner*—Andres Kashnikow
*Assistant Examiner*—Virna Lissi Mojica
*Attorney, Agent, or Firm*—Kokjer, Kircher, Bowman & Johnson

[57] ABSTRACT

An aircraft which rolls along a guide rail at low speeds and attains aerodynamically airborne flight guided along the rail at high speeds. The guide rail structure includes I beams suspended end to end from spaced apart arches. The guide rails are mounted on the lower ends of the I beam and include flat bottom surfaces and curved upper surfaces that receive the wheels of the aircraft in the low speed operating mode. The upper surfaces are portions of elliptical surfaces to assure proper positioning of the aircraft wheels. In the high speed airborne mode of operation, proximity sensors on the aircraft sense the distance to the guide rail. Controls receive inputs from the sensors and adjust the flight path accordingly.

15 Claims, 4 Drawing Sheets

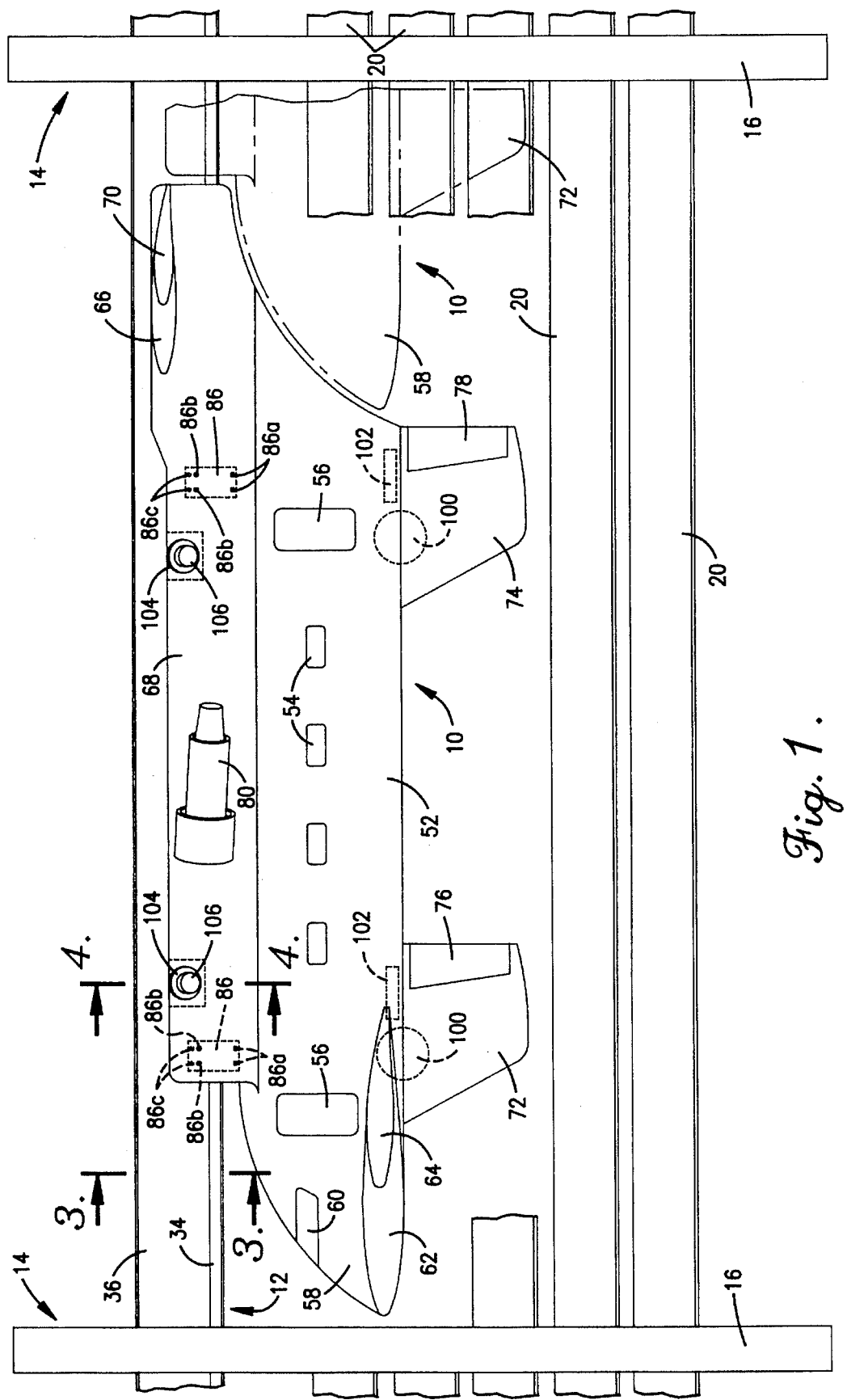

TRANSPORTATION SYSTEM EMPLOYING AIRCRAFT GUIDED BY RAIL

FIELD OF THE INVENTION

This invention relates generally to the field of transportation and more particularly to a self-propelled aircraft which is capable of airborne flight along a guide rail and which rolls along the guide rail in terminal areas and at other times when not in flight.

BACKGROUND OF THE INVENTION

U.S. Pat. No. 4,402,272 to Lehl et al. discloses a transportation system which includes an aircraft guided along an elevated rail. The aircraft has wheels which roll on the rail structure when the vehicle is operating at low speeds such as when it is approaching or departing from terminal areas. The aircraft normally travels along the rail in airborne flight at high speed and is guided along the rail by a system that includes sensors and controls for adjusting the flight path according to inputs received from the sensors. In this manner, the aircraft and rail system accommodate slow speeds in terminal areas and high speeds between terminals.

Although this type of system has considerable potential to achieve efficiencies in the transportation of passengers and cargo, further development work has indicated that there is room for improvement. In particular, the need for an air bearing between the guide rails and the aircraft involves considerable complexity both in the structures of the aircraft and rails and also in the pneumatic system required to supply air for the air bearing. The guide rail disclosed in the '272 patent is complicated and thus expensive to construct, primarily because the air bearing requires two round rails spaced apart from one another. The guide rail structure has two vertical plates, a top plate, the two round rails, and ribs that connect the rails with the rest of the structure. This complicated construction involves considerable expense.

The guidance system of the aircraft is likewise rather complicated. Two concentric tubes are required to surround the round guide rails and provide the air bearing. In addition, a manifold and hose system is required to direct the air to the air bearing. The overall result is that the system is characterized by considerable complexity which increases the cost, the maintenance requirements, and the potential for operational and safety problems.

SUMMARY OF THE INVENTION

The present invention is directed to a transportation system which is reduced in cost and complexity compared to the system disclosed in U.S. Pat. No. 4,102,272.

In accordance with the invention, an aircraft which carries passengers and/or cargo travels along an elevated overhead guide rail in alternative modes of travel. In a low speed mode which is generally used near terminals or when the craft is stopping or starting for other reasons, the aircraft rolls along the guide rail. In a high speed airborne mode of operation, the aircraft achieves aerodynamically airborne flight at a high speed and is guided along the rail by a precision guidance system. The guidance system includes sensors which are sensitive to the location of the rail and provide inputs to flight control components which adjust the path of flight according to the information received from the sensor. The sensors are preferably provided in modules which contain redundant pairs of sensors for added safety and reliability.

The simplified construction of the guide rail and its support structure is an important feature of the invention. Ground mounted arches include upright posts or legs and a cross bar extending between the top ends of the posts. Carried on the arches are I beams which are arranged end to end. Each arch supports the adjacent ends of the I beams through a looped strap secured to the I beams and pinned to support bars which are mounted on the arch.

The guide member along which the aircraft travels is formed by guide rails which are mounted on the I beams and arranged end to end. The upper surface of each guide rail is curved in the shape of a portion of an elliptical surface. A bottom surface of the guide rail is formed by two flat plates which extend on opposite sides of the lower I beam flange and are co-planar with one another and with the flange. The elliptical surface is formed by curved plates which connect at their outer edges with the outer edges of the bottom plates and at their inner edges with the web of the I beam. Internal spacer plates are secured to extend between the top plates and bottom plates to strengthen and increase the rigidity of the guide rail structure. Longitudinal bars strengthen and reinforce the connections between the curved plates and the I beam web.

This guide rail structure exhibits the necessary strength and yet is simple and economical to construct. It also allows the proximal aircraft surfaces to be constructed in a simplified manner. The sensors are located on aircraft surfaces that are closest to the guide rail and are able to accurately sense the aircraft position relative to the rail both vertically and side to side or laterally. The elliptical shape of the top guide rail surface assures that the aircraft remains properly positioned on the rail when it is operated in the low speed mode. This "self-centering" feature of the guide rail shape, combined with its simplified and economical construction, enhances the practicality of the transportation system and represents a considerable improvement.

Advantages for this transportation system, compared to other high-speed ground transport systems are: (1) minimal maintenance of the rail since no high speed physical contact occurs; (2) intersecting another existing roadway is relatively easy and inexpensive since overflying is simply a matter of elevation by extending the arches; (3) the land under the track remains available for farming, animal grazing, etc.; (4) the initial cost for the track system is inexpensive compared to magnetic levitation; (5) all-weather operation is possible.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary side elevational view of a transportation system equipped with an aircraft and guide rail structure constructed according to a preferred embodiment of the present invention, with a second aircraft unit depicted in broken lines and coupled to the first aircraft unit;

DETAILED DESCRIPTION OF THE INVENTION

Figure 2:
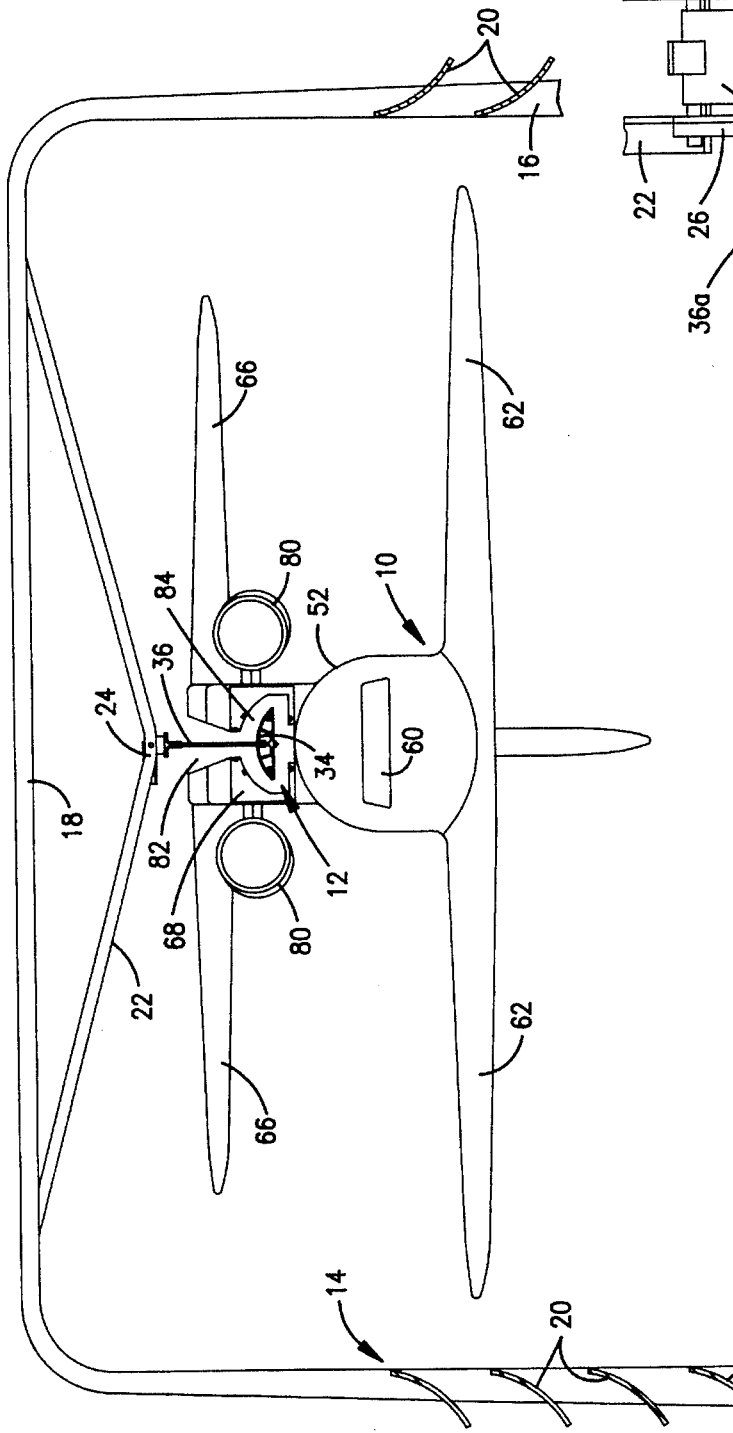
FIG. 2 is a front elevational view of the aircraft and guide rail structure shown in FIG. 1, with a portion of one leg of the supporting arch broken away.

Referring now to the drawings in more detail and initially to FIGS. 1 and 2 in particular, a transportation system constructed in accordance with a preferred embodiment of the present invention includes an aircraft which is generally identified by numeral 10. The aircraft 10 travels in two different operating modes along an elongated guide structure which is generally identified by numeral 12. The guide structure 12 is supported on a plurality of spaced apart arches which are generally identified by numeral 14. Each arch 14 has a pair of vertical posts or legs 16 which are spaced apart far enough to allow the aircraft 10 to travel between them. The lower ends of the legs 16 are suitably secured to the ground which underlies the aircraft. A horizontal cross member 18 extends between the upper ends of the legs 16 of each arch and is preferably integral with the legs. Each of the cross members 18 is located at an elevated position well above the ground. Curved vanes 20 extend between the adjacent legs 16 on each side of the support structure. The vanes 20 act as gust spoilers which deflect and disrupt winds directed sidewardly toward the aircraft 10. The vanes 20 may be surfaced with sound absorbing material in order to perform a noise abatement function.

Each elevated cross member 18 is provided with a pair of structural bars 22. The bars 22 in each pair are shaped identically and are spaced apart and parallel to one another. Each bar 22 has a bent configuration and presents an apex 24 located a short distance below the center of the overlying cross member 18.

Figure 5:
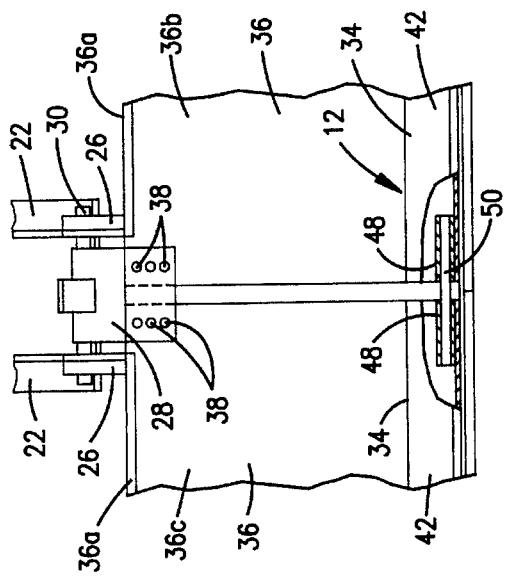
FIG. 5 is a fragmentary side elevational view showing the details of the mounting structure for the guide rail of the transportation system, with portions broken away for purposes of illustration.
Figure 3:
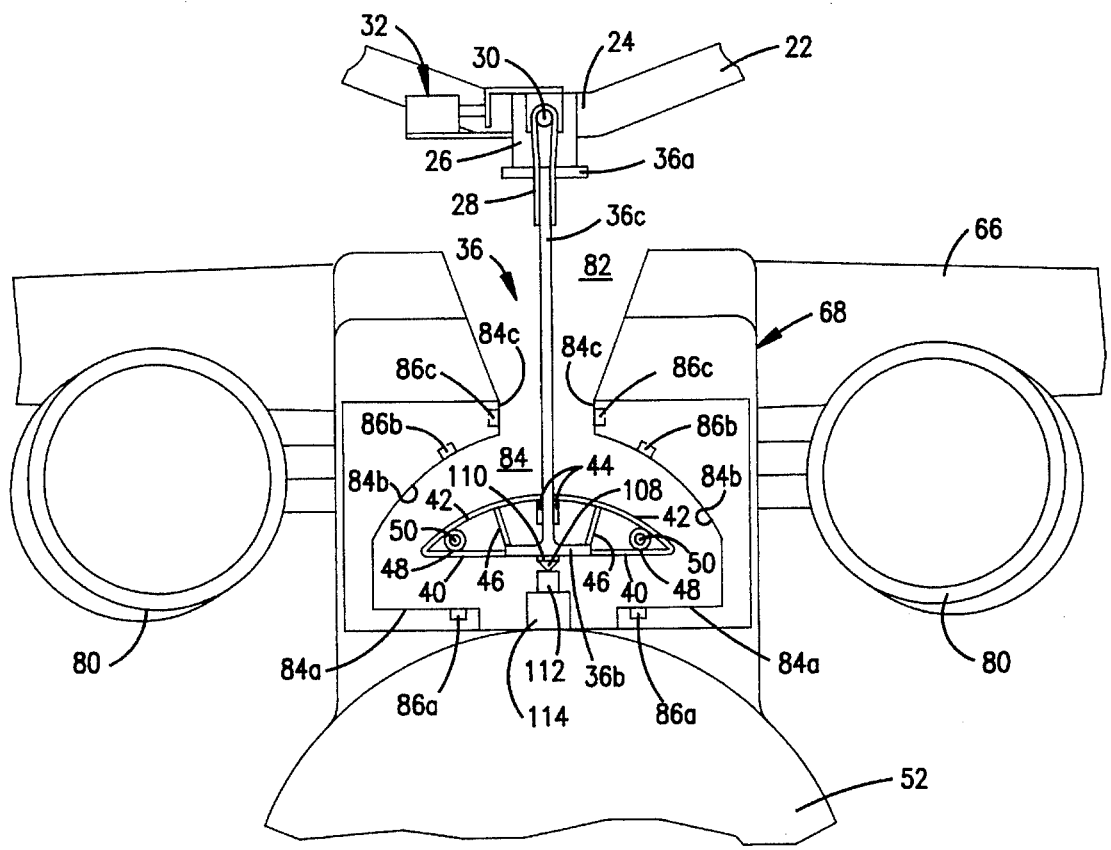
FIG. 3 is a fragmentary sectional view on an enlarged scale taken generally along line 3—3 of FIG. 1 in the direction of the arrows and showing the aircraft in the high speed airborne mode of operation.

As best shown in FIGS. 3 and 5, the apex 24 of each support bar 22 is provided with an ear 26. A metal strap 28 is looped around a horizontal pin 30 which extends between the ears 26, thus pinning the strap 28 to the support structure. Side to side adjustment of the strap 28 is effected by a suitable adjustment mechanism 32 (see FIG. 3 in particular).

The guide structure 12 is formed by a plurality of guide rails 34 which are arranged end to end and carried on the lower ends of corresponding I beams 36 which are secured to the straps 28. With particular reference to FIG. 5, the I beams 36 are arranged generally end to end, with one of the straps 28 connecting with the adjacent ends of each pair of I beams 36. Suitable fasteners 38 are used to connect the straps 28 with the I beams 36. The ends of the I beams 36 are spaced slightly apart to permit thermal expansion.

Figure 4:
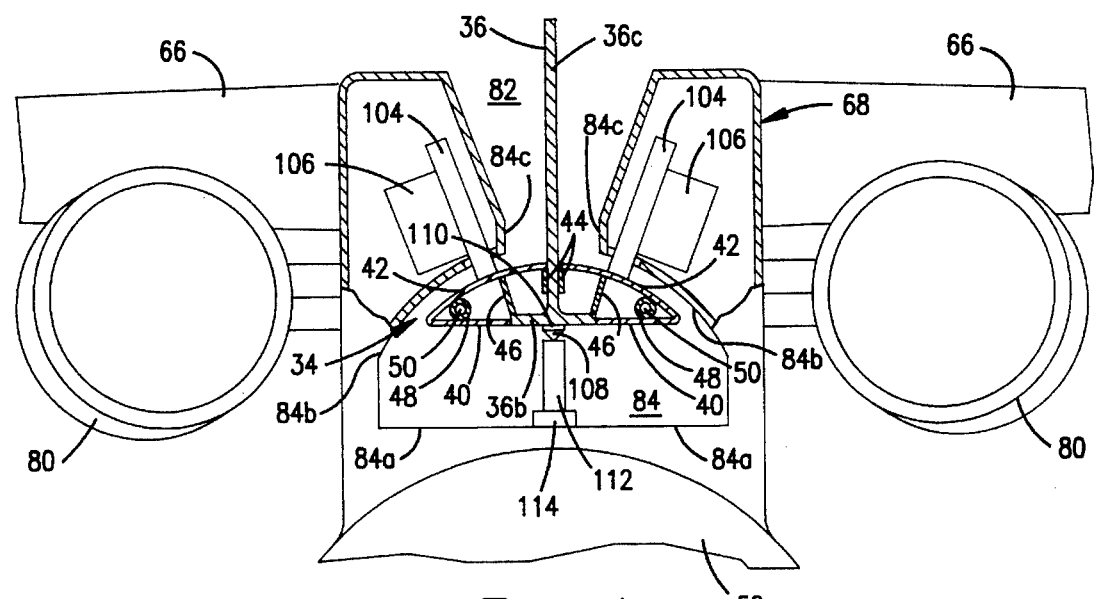
FIG. 4 is a fragmentary sectional view on an enlarged scale taken generally along line 4—4 of FIG. 1 in the direction of the arrows and showing the aircraft rolling on the guide rail in a low speed mode of operation.

With particular reference to FIGS. 3 and 4, each I beam 36 has a horizontal top flange 36a, a horizontal bottom flange 36b, and a vertical web 36c which extends between the centers of the flanges 36a and 36b. Each of the guide rails 34 includes a pair of flat bottom plates 40 which extend horizontally from the opposite side edges of the bottom flange 36b. The plates 40 and flange 36b are co-planar and cooperate to provide a horizontal flat bottom surface of each guide rail 34. The upper surface of each guide rail is provided by a pair of curved plates 42. The outer edge of each plate 42 connects with the outer edge of the corresponding bottom plate 40. The plates 32 intersect with the web 36c and are connected with the web at their inside edges. Longitudinal reinforcing bars 44 are applied at the intersections between the top plates 42 and the web 36c to strengthen and reinforce these connections. The top surfaces of the upper plates 42 cooperate to provide a curved top surface of each guide bar 34 which has the shape of a portion of an elliptical surface. Each guide rail 34 is strengthened and made more rigid by a pair of spacer plates 46 which extend from the outer edges of the lower flange 36b to connection with the respective top plates 42.

The adjacent ends of the guide rails 34 are connected in a manner accommodating thermal expansion and contraction. A pair of sleeves 48 are welded or otherwise secured to the end portions of each guide rail 34. The sleeves 48 are located within the guide rail near their opposite side edges. As best shown in FIG. 5, the sleeves 48 in the adjacent ends of the guide rails are aligned with one another, and each pair of aligned sleeves 48 receives a pin 50. The pins 50 and sleeves 48 maintain the adjacent ends of the guide rails in alignment while accommodating expansion and contraction caused by thermal effects. In this manner, the guide rails 34 are mounted end to end and provide a substantially continuous guide rail which is arranged to provide the desired path of travel of the aircraft 10. Turns of the guide rail structure may be banked, and the curvature of the turns should be no more abrupt than can be accommodated by the aircraft.

Referring to FIG. 1 in particular, the aircraft 10 has a tubular main body 52 which provides a cabin compartment for passengers and/or cargo. The body 52 may be provided with windows 54 and doors 56 near the front and back of the craft. A cockpit 58 at the front end of the aircraft is suitable for accommodating one or more crew members and has a window 60 which provides an unobstructed view from the cockpit. A pair of forward wings 62 extend laterally in opposite directions from the forward end of the aircraft body 52. Each of the forward wings 62 may have suitably controllable forward flaps (not shown) as well as controllable rearward flaps 64. The forward wings 62 are located low on the aircraft body.

The aircraft also has a pair of rear wings 66 which are mounted near the back end of the aircraft on the opposite sides of an elongated box structure 68 mounted on top of the aircraft body 52. The rear wings 66 extend laterally in opposite directions from the aircraft and may be provided with controllable forward flaps (not shown) and controlled rearward flaps 70.

Additional control of the aircraft flight path is provided by forward and rearward fins 72 and 74, respectively. The fins 72 and 74 are oriented vertically and extend downwardly from the bottom of the aircraft body 52 near its respective front and back ends. The back edge of the forward fin 72 has a controllable rudder 76. A similar controllable rudder 78 is provided on the back edge of the rear fin 74.

Figure 6:
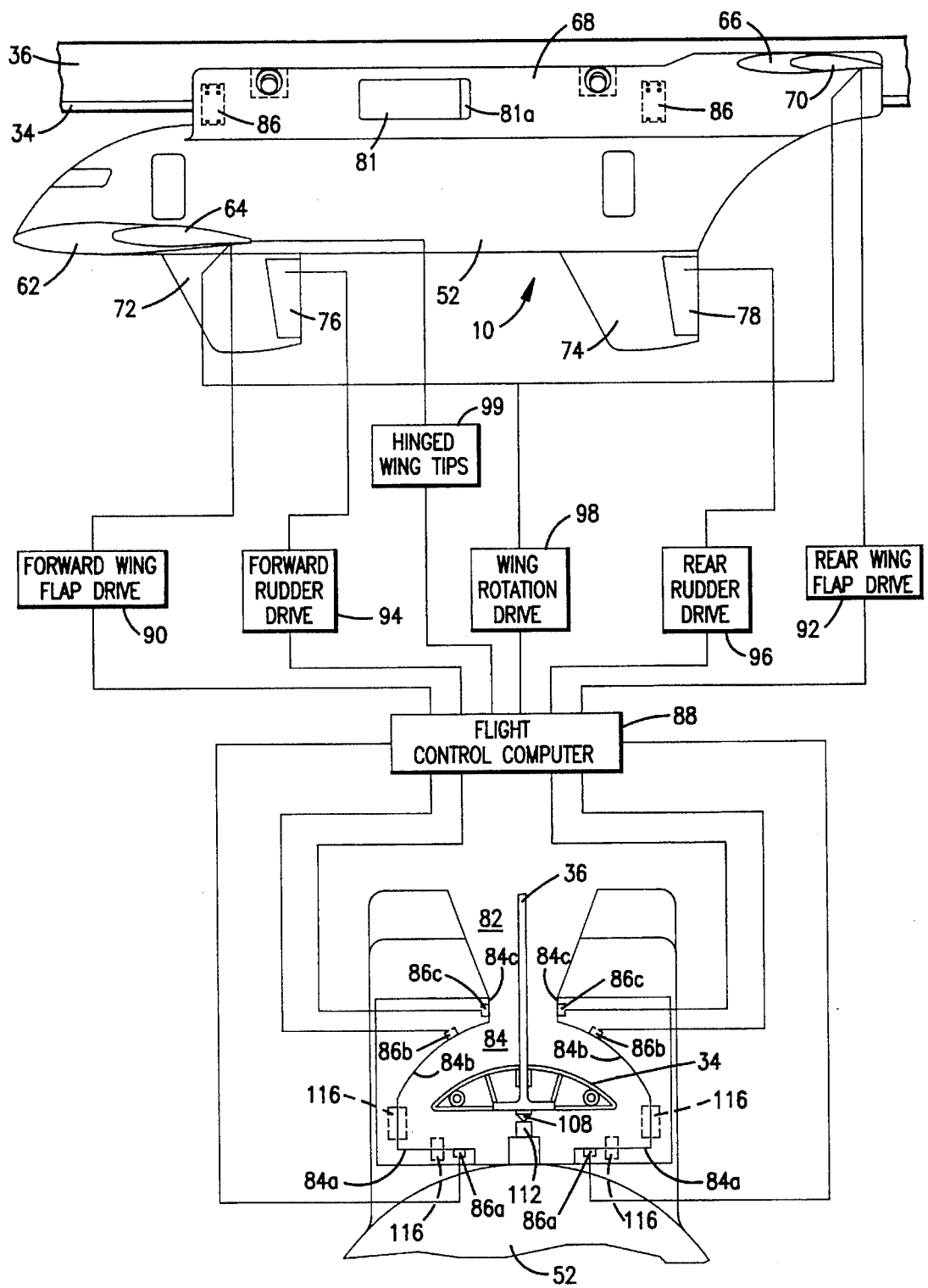
FIG. 6 is a diagrammatic view showing the sensor and control system for guiding the aircraft along the guide rail in the airborne mode of operation.

The aircraft is provided with a suitable propulsion system which may include a pair of high bypass turbo fan engines 80 or electric motor-driven ducted propellers 81 (see FIG. 6). The engines 80 or 81 are mounted on opposite sides of the box 68 near the center of the aircraft body 52.

As best shown in FIGS. 3 and 4, the top of the box 68 is provided with a central longitudinal slot 82 which connects with a larger passage 84. The slot 82 and passage 84 extend the entire length of the box 68. The I beam webs 36c extend through the slot 82, and the guide rails 34 are located within the passage 84. On its opposite side portions, the passage 84 has flat bottom surfaces 84a which are horizontal surfaces parallel to and lying below the bottom plates 40 of the guide rails 34. The upper portion of the passage 84 is bounded on its opposite sides by curved surfaces 84b which may be portions of elliptical surfaces generally conforming with the shape and curvature of the top plates 42 of the guide rails. Flat vertical surfaces 84c are located on opposite sides of a neck portion formed at the area of intersection of slot 82 with passage 84. Surfaces 84c are spaced on opposite sides of the webs I beam 36c.

Each side of the box 68 is provided with a pair of sensor modules 86 which are located near the front and back ends of the aircraft body 52, as best shown in FIG. 1. The sensor modules 86 may be slid laterally in and out of suitable compartments which receive them, and they may be locked releasably in place by suitable fastening mechanisms (not shown). Each sensor module 86 includes a pair of lower proximity sensors 86a, a pair of intermediate proximity sensors 86b, and a pair of upper proximity sensors 86c. The pairs of sensors in each module are redundant such that only one of the sensors 86a, one of the sensors 86b and one of the sensors 86c in each module is active at a given time. If one of the sensors in any of the modules malfunctions, the paired sensor automatically takes over the sensing function, and a suitable indication of the malfunctioning sensor is given in the cockpit or elsewhere so that corrective action can be taken to repair or replace the malfunctioning sensor.

As best shown in FIG. 3, the modules 86 on opposite sides of the box 68 oppose one another. The lower sensors 86a are located on the bottom surfaces 84a, the intermediate sensors 86b are located along the curved surfaces 84b, and the upper sensors 86c are located on the vertical surfaces 84c. The sensors 86a, 86b and 86c may be conventional proximity sensors which sense the distance from the sensor to the corresponding conductive surface toward which the sensor is directed. For example, the lower sensors 86a are directed toward the bottom plates 40 and are able to precisely sense the distance between the sensors 86a and the plates 40. Sensors 86b function similarly to sense the distance between them and the curved top plates 42. Each sensor 86c senses the distance between it and the I beam web 36c.

As shown diagrammatically in FIG. 6, the transportation system has a flight control computer 88 which receives inputs from the sensors 86a, 86b and 86c. The flight control computer 88 provides an output to a forward wing flap drive 90 which responds to the computer output signal by suitably adjusting the corresponding front wing flap 64 (and/or the flap on the forward edge of the front wing). Another output from the computer 88 is applied to a rear wing flap drive 92 which suitably adjusts the flap 70 (and/or the controllable flap on the front edge of the corresponding rear wing 66). A forward rudder drive 94 also receives an output signal from the computer and responds by suitably adjusting the front rudder 86. Similarly, a rear rudder drive 96 is controlled by the computer 88 to adjust the rear rudder 78 in a manner to achieve the desired flight path. The computer 88 is programmed to maintain preselected distances between the sensors 86a, 86b and 86c and the corresponding surfaces of the guide structure in order to maintain the flight path of the aircraft in the proper relationship to the guide structure.

As further shown in FIG. 6, the flight control computer 88 may provide an output signal to a wing rotation drive 98. Because the aircraft 10 must fly parallel to the guide structure and is unable to "crab into the wind" in the manner of a conventional aircraft, somewhat unusual aerodynamic devices may be provided on the aircraft. For example, the wings may be fully pivoting or variable camber structures, the aircraft fins may be fully pivoting vertical stabilizers, jet deflectors may be provided, and/or the aircraft may have hinged wing tips. One or more of these devices may be suitably controlled by the wing rotation drive 98 in a manner to achieve the desired flight path. To add more roll stability to counter the effect of side winds, a hinged wingtip (not shown) may be provided on the forward wing. This is a novel device for aircraft aerodynamic control and is necessitated by the requirement that the vehicle remain aligned with the guideway rather than "crabbing" into the wind as airplanes do. This must be a rapid response wing tip deflector which is actuated by a suitable power driven actuator. A hinged wing tip control 99 controls the actuator for the hinged wing tips.

Additional stabilization and/or control may be provided by a pair of anti-roll/yaw gyroscopes 100 which are located near the front and back portions of the aircraft body 52 (see FIG. 1). A pair of anti-pitch/roll gyroscopes 102 (FIG. 1) may likewise be provided near the front and back portions of the aircraft. The gyroscopes 100 and 102 may be constructed conventionally and arranged to provide flight stability and counteract the effects of lateral wind gusts and head wind gusts applied to the aircraft.

The aircraft 10 is provided with pairs of front and rear wheels 104 which are mounted to the box 68 near its front end and toward its rear end, as best shown in FIG. 1. Referring additionally to FIG. 4, each wheel 104 is mounted within the box structure 68 and projects downwardly through surface 84b into the opening 84. In the low speed mode of operation, the wheels 104 contact and roll on the elliptical surfaces provided by the curved plates 42 of the guide structure. The rotational axis of each wheel 104 is parallel to a line tangent to the surface of plate 42 at the place of contact between the wheel and the plate 42. Thus, the wheels 104 provide a "self-centering" feature which assures that the aircraft will be suitably centered on the guide rail 34 in the low speed mode of operation.

Each wheel 104 is driven by a conventional electric drive unit 106. Electrical power for the ducted propellers 81, drive units 106 and other electrically operated devices may be provided by conductor wires 108 which are mounted to extend along the center of the lower I beam flange 86b. The wires 108 are insulated from the I beam by an insulator 110. Conductors (not shown) leading from a suitable power source connect with the conductor 108 which functions in the manner of a conventional trolley wire. The conductor 108 is engaged by a spring loaded electrical contact 112 carried on the aircraft 10 and insulated by a suitable insulator 114. Suitable wiring (not shown) extends from the contact 112 to the drive units 106 and other electrically operated devices within the aircraft. As can be seen by comparing FIGS. 3 and 4, the contact 112 can extend and retract to accommodate both airborne and rolling travel of the aircraft while maintaining electrical contact with wire 108.

The contact 112 may take the form of an arm having universal joints (such as ball and socket joints) on both ends. The top end of the arm is guided along a channel. The electric power may be three-phase power, with the three conductor wires of the electrical system contacted by sliding brushes (not shown) carried on the top end of the contact 112. This type of system allows continuous supply of power from the rail system to the vehicle.

As an alternative to the turbofan engines 80 and the electrical drive units 106, the propulsion system for the aircraft may be provided by ducted propellers housed in external nacelles 81 (FIG. 6) and powered by electric motors (not shown). In this case, the propellers provide propulsion for the airborne flight of the aircraft and also for the low speed rolling operation of the aircraft, the wheels 104 being idle or free wheeling units. Braking is accomplished by reverse pitch of the propellers. Electrical power for the drive motors of the propellers is provided through the conductor 108 and contact 112.

To counter the effect of a steady side wind, thruster vanes 81a at the aft end of the propulsion cowling 81 direct the exiting air to create a transverse force preventing transverse movement of the vehicle.

While propulsion can be provided by either turbofan engines or electric ducted propellers, the propellers have a number of benefits and are preferred in most applications. The ducted propeller drive system is advantageous in that it is quiet, non-polluting and reduced in weight because there is no need to carry fuel (which can make up 30% of the weight of a transport aircraft). Also, there is no need for fueling stops. Because terminals would likely be in downtown areas or other areas of dense population, fueling with jet fuel at terminals is impermissible. Thus, a fuel carrying craft would require an added stop at a fueling depot away from heavily populated areas. Ducted propeller drives are also better able to make use of side-vectored thrust which can be obtained through the use of simple vanes. With propeller systems, the wheels need not be driven, as previously indicated. Finally, fore and aft forces on the rail system are eliminated, and thrust and braking can both be accomplished by variable and reversible blade pitch. Forces on the arches in their weakest direction are thus avoided.

As shown in FIG. 6, the front and rear parts of the vehicle are equipped with sets of buffer wheels 116 which are preferably surfaced with hard rubber. Their purpose is to prevent metal to metal contact if the craft should undergo a large deflection. The main wheels 104 assist in the buffering function. The buffer wheels 116 are in a transverse plane which is offset from but near the proximity sensors.

It is contemplated that the transportation system may have tracks allowing two vehicles to travel in opposite direction. In the two track system, the rails can be located side by side or one above the other and supported in a manner similar to but somewhat more complicated than what has been shown and described.

In operation, the transportation system may be used to transport passengers and/or cargo between terminals located along the guide structure 12. After the passengers and/or cargo have been loaded into the aircraft, the drive units 106 are activated to propel the aircraft 10 along the guide structure 12 in the low speed mode of operation wherein the wheels 104 roll forwardly along the upper plates 42 of the guide rails 34. Normally, the terminal area will be in an area where noise is objectionable, so the engines 80 will usually not be operated until the aircraft is well away from the terminal area. The engines 80 can be activated to propel the aircraft as it approaches flying speed (such as 70–80 knots). The aerodynamic capabilities of the aircraft will then provide sufficient lift to lift the aircraft slightly from the position shown in FIG. 4 to the flight position shown in FIG. 3. Then, the wheels 104 will be displaced from the guide rail 34 so that undue friction is avoided. In the high speed airborne operating mode of the aircraft which is depicted in FIG. 3, the guidance system operates to automatically maintain the aircraft in the programmed position relative to the guide rail 34 (the position shown in FIG. 3).

Prior to the approach of the aircraft to another terminal, the speed is reduced to less than that necessary to maintain airborne flight, and the aircraft is lowered from the position of FIG. 3 to the position of FIG. 4 wherein the wheels 104 are in contact with the guide rails 34. The aircraft is thereafter propelled in the low speed mode to the terminal area, at which point the aircraft is stopped for unloading and/or loading of passengers and/or cargo. It is noted that the wheels 104 remain in a position to come into contact with the guide rails whenever the aircraft loses flying speed. Two or more aircraft can be coupled together (see FIG. 1) by conventional coupling devices to provide a multiple unit "train" of aircraft.

The construction of the guide rail 12 and its supporting structure is simple and economical. In addition, the upper sensors 86c are located such that they can precisely control the side to side position of the aircraft by sensing the position of the I beam web 36c. The lower sensors 86a are located on the flat surfaces 84a and sense the distance to similar flat surfaces on plates 40 to provide precise guidance of the aircraft. Thus, the configuration of the guide rail 34 and its support structure (especially the I beam 36) enhances the precision of the guidance system.

From the foregoing, it will be seen that this invention is one well adapted to attain all the ends and objectives hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A transportation system comprising:

an elongated guide rail having a curved top surface and a generally flat bottom surface;

means for mounting said guide rail at an elevated position;

an aircraft capable of attaining aerodynamically airborne flight in ambient air;

wheel means on said aircraft for rolling contact with said top surface of the guide rail to support the aircraft for movement along the guide rail when the aircraft is not in flight;

first sensor means on said aircraft for sensing the distance from the first sensor means to said top surface of the guide rail;

second sensor means on said aircraft for sensing the distance from the second sensor means to said bottom surface of the guide rail;

guidance means receiving inputs from said first and second sensor means and operable to control the path of the aircraft in flight in a manner to maintain a selected distance between the first sensor means and said top surface and between the second sensor means and said bottom surface, thereby guiding the aircraft in flight along said guide rail with said wheel means displaced therefrom; and power means for propelling said aircraft.

2. The system of claim 1, wherein said top surface has the general configuration of a portion of an elliptical surface in section.

3. The system of claim 2, wherein:

said top surface and bottom surface of the guide rail are connected at opposite side edges of the guide rail; and said guide rail includes a pair of spacer plates extending between the top and bottom surfaces thereof.

4. The system of claim 3, wherein said mounting means for the guide rail comprises:

a plurality of spaced apart supports each having an elevated cross member; and a beam having a generally vertical web connected with said cross member and a generally horizontal flange to which said guide rail is mounted.

5. The system of claim 4, wherein:

said bottom surface of the guide rail is connected to and is substantially co-planar with said flange; and said top surface of the guide rail is connected with said web.

6. The system of claim 1, wherein:

said top surface and bottom surface of the guide rail are connected at opposite side edges of the guide rail; and said guide rail includes a pair of spacer plates extending between the top and bottom surfaces thereof.

7. The system of claim 6, wherein said mounting means for the guide rail comprises:

a plurality of spaced apart supports each having an elevated cross member; and, a beam having a generally vertical web connected with said cross member and a generally horizontal flange to which said guide rail is mounted.

8. The system of claim 1, wherein said mounting means for the guide rail comprises:

a plurality of spaced apart supports each having an elevated cross member; and a beam having a generally vertical web connected with said cross member and a generally horizontal flange to which said guide rail is mounted.

9. The system of claim 8, wherein:

said bottom surface of the guide rail is connected to and is substantially co-planar with said flange; and said top surface of the guide rail is connected with said web.

10. The system of claim 9, wherein said top surface has the general configuration of a portion of an elliptical surface in section.

11. The system of claim 8, wherein said top surface has the general configuration of a portion of an elliptical surface in section.

12. A transportation system comprising:

a plurality of spaced apart supports each having an elevated cross member;

a plurality of beams each having an upper end connected with the cross members of two adjacent supports in a manner to mount the beams generally end to end at an elevated position, each beam having a lower end provided with a generally horizontal flange and a generally vertical web extending between the upper and lower ends of the beam;

a guide rail mounted on each beam with the guide rails arranged end to end to provide a substantially continuous guide member, each guide rail having a generally flat bottom surface which is substantially co-planar with said flange and a curved top surface which intersects with said web and connects with said bottom surface at opposite side edges of the guide rail;

a winged aircraft capable of attaining fully aerodynamic flight in ambient air including the capability of applying lift, thrust and sideward forces and control of roll, pitch and yaw moments, said aircraft having a plurality of wheels arranged to roll along said top surface of the guide rails when the aircraft is not in aerodynamic flight and an aircraft body located beneath said guide rail;

propulsion means for propelling said aircraft in high speed fully aerodynamic flight or alternatively in low speed rolling motion along the guide rail top surfaces; and guidance means for guiding said aircraft along said guide member in fully aerodynamic flight with said wheels spaced above the guide rail.

13. The system of claim 12, wherein said top surface has the general configuration of a portion of an elliptical surface in section.

14. The system of claim 13, wherein said guide rail includes a pair of spacer plates extending between said top and bottom surfaces.

15. The system of claim 12, wherein said guide rail includes a pair of spacer plates extending between said top and bottom surfaces.

* * * * *